2,853,742

PROCESS FOR REDUCING SCRAP VULCANIZED RUBBER TO FINELY DIVIDED PARTICLES

Paul J. Dasher, Willoughby, Ohio, assignor to Dasher Rubber & Chemical Company, Fairport Harbor (Painesville), Ohio, a corporation of Ohio No Drawing. Application April 22, 1954
Serial No. 425,039

9 Claims. (Cl. 18—48)

This invention relates to the production of rubber in the form of finely divided powders.

More particularly, the invention is concerned with the production of powdered rubber from scrap vulcanized rubber material, such as is normally available in large quantities in the form of used rubber tires, tire tubes, so-called mechanical rubber goods, scrap latex sponge, and the like.

It is known to produce rubber powders directly from latex, as by the method described in patent to Stam 2,002,252, according to which rubber latex is spray-dried, in the presence of protective colloid, to dehydrate the latex to form a powder thereof, or by methods such as described in patent to Murphy 1,953,972, according to which inert fillers are precipitated in situ in latex, with simultaneous coagulation of the latex, in the form of a flocculent mass, followed by removal of the water.

It is also known to reduce vulcanized scrap rubber to relatively small discrete particles by grinding the same in various mechanical grinders. These known grinders are by their nature, however, incapable of reducing scrap vulcanized rubber to particles finer than about twenty or thirty mesh.

The principal object of the invention is to provide vulcanized scrap rubber in the form of a powder, the coarsest particles of which will be sufficiently small to pass a forty mesh screen, and varying downward in size to as fine as 200 mesh.

The invention is applicable to the production of powdered rubber from scrap composed of vulcanized natural rubber as well as from scrap composed of vulcanized synthetic rubbers, such as the butadiene copolymers, known as Buna S and Buna N, the copolymer of isobutylene and isoprene known as butyl rubber, the polychloroprenes known as neoprene, mixtures of such polymers or copolymers, and mixtures of any of these with vulcanized natural rubber. The term "rubber," as used herein, is accordingly to be understood, unless otherwise qualified, to include natural rubber as well as synthetic rubber such as those of the types above-mentioned, and mixtures of any of them.

The powders of vulcanized scrap rubber obtainable by the invention, including those embodiments thereof wherein the particles are of a fineness to pass through a 200 mesh screen, are further characterized by substantially complete freedom from stickiness, being readily pourable and similar in that respect to other finely divided or powdered solids. This characteristic of the product is apparently accounted for by the fact that by the method of producing the same, as will hereinafter be more fully described, the rubber component does not become significantly plasticized, but on the contrary, the rubber component of each particle is in substantially the same state of vulcanization as in the scrap from which it is derived. This characteristic of the rubber powder of my invention, so far as I am aware, is unique in the rubber art, and renders the product highly suitable for a wide variety of industrial uses, for example, as a rubber filler, a compounding ingredient, and for other purposes, as will be readily apparent to those skilled in the art.

Another important object and advantage of the invention is that it makes possible the production of powdered rubber from vulcanized scrap, in a range of mesh sizes not heretofore available, by means of equipment available on the market and indeed already in use for other purposes by producers of various rubber products.

Briefly, according to the invention, vulcanized scrap rubber may be reduced to the form of powder of predetermined mesh size by treatment of the scrap in the well-known Banbury machine, operated under controlled conditions, as will be more fully hereinafter set forth.

The Banbury machine has long been known and used in the rubber industry for masticating raw or unvulcanized rubber, as well as for mixing and compounding the same with fillers, vulcanizers, and other compounding agents. The machine comprises essentially a pair of bladed rotors mounted for rotation adjacent one another in opposite directions within semi-cylindrical troughs or chambers, the rotors being so shaped as to smear the material in the chambers against the walls thereof, forcing it upwardly and kneading it as it moves toward the longitudinal center of the machine from one chamber to the other, the material being held within the sphere of action of the bladed rotors by a pneumatically operated ram. The general construction of the Banbury machine in the form in which it has been extensively employed in the rubber industry for breaking down or masticating rubber and for compounding the same with fillers, etc., is shown, for example, in the Banbury patent, 1,881,994.

The Banbury machine has been heretofore adapted, as set forth in the patent to Banbury et al., 2,461,192, to the treatment of scrap vulcanized rubber for reclaiming the same by thermo-mechanical action. This adaptation of the machine for the reclaiming of vulcanized rubber involves the treatment of the vulcanized scrap by an intense mechanical action exerted by the bladed rotors while the material in the working chamber is held under high mechanical compression by the ram, so as to bring about a high input of mechanical energy at a very rapid rate by the high internal friction and shear in the material from the resulting action of the bladed rotors. Vulcanized scrap rubber may thus be plasticized and reclaimed by thermo-mechanical action within a matter of minutes, depending upon the horsepower input developed by the action of the machine. The horsepower input for this purpose is of the order of at least 1½ horsepower per pound of scrap, thereby raising the temperature of the batch to within the range of 425° to 550° F., in a relatively short period of treatment in the machine, and causing the rubber to be plasticized and de-vulcanized.

By my invention, on the other hand, scrap vulcanized rubber is reduced by means of a Banbury machine to the form of relatively finely divided powders of within the range of forty to 200 mesh, without significant de-vulcanization of the rubber, such as would manifest itself in substantial agglomeration of the particles, being rather a dry, non-sticky, readily pourable powder, such as has not heretofore been known, and possessing a number of other advantages in the use thereof for a variety of purposes.

As above-indicated, the conventional grinding machines heretofore used for grinding of scrap vulcanized rubber neither lend themselves to, nor are they capable of reducing vulcanized rubber to the form of powder of fineness better than approximately 30 mesh. Nor, so far as known to me, has there been, prior to my invention, any suggestion by those skilled in the art for adapting the Banbury machine to an operation whereby to cause it to function as a mechanical grinder for vulcanized scrap rubber.

As generally illustrative of the powdered vulcanized rubber of the invention, I have employed as a starting material, so-called tire buffings having a rubber hydrocarbon content of approximately 55%. This starting material was in the form of pieces averaging approximately six mesh, with substantially none smaller than eight mesh. Based on an average of sixteen runs of this material, the powdered product obtained as a result of treatment of the tire buffings in accordance with the invention was of a size such that approximately 87% thereof passed a 40 mesh screen, with not more than about 5% being retained on a twenty mesh screen. In these runs, the time consumed in reducing the tire buffings to this powdered form was approximately one and one-half minutes.

As another illustration, there was employed as the starting material a so-called gas ball stock, having a rubber hydrocarbon content of approximately 30%. This material was in the form of pieces of approximately four mesh. With a grinding time of approximately two minutes in the Banbury machine under conditions embodying the invention, there resulted a powdered product having a particle size such that less than 2% was retained on a forty mesh screen, as an average based on nineteen separate runs. Indeed, in four of these runs, the powdered product was of a fineness such that it all passed through the forty mesh screen.

Still further generally illustrative of the invention, are the results obtained when the starting material was so-called latex sponge scrap. This material had a rubber hydrocarbon content of approximately 95% and was in the form of relatively large pieces or chunks. The powdered product obtained in forty-four separate runs of this material utilizing a treatment time of one and one-half minutes showed an average of approximately 92% passing through a forty mesh screen, approximately one-third of this being seventy mesh or finer.

The finely divided character of the powdered vulcanized rubber in the above illustrations is in marked contrast to the forms of ground vulcanized rubber commercially available prior to my invention. The contrast between the powdered condition of vulcanized rubber made possible by the invention will be more readily apparent from the following tabulation of the screen analysis (Tyler Standard Screen) of a commercially available grade of ground vulcanized rubber compared with the average of the screen analyses of the powdered material obtained therefrom in three typical runs according to the invention:

CUMULATIVE PERCENT WEIGHT RETAINED

| Mesh Size | Commercial Grade | Average of Three Runs According to Invention |
| --- | --- | --- |
| 16 | 1.13 | 1.10 |
| 20 | 12.68 | 3.37 |
| 30 | 43.37 | 7.63 |
| 40 | 77.03 | 16.44 |
| 50 | 88.58 | 54.22 |
| 70 | 93.45 | 75.56 |
| 100 | 97.96 | 95.85 |
| Pass | 2.03 | 4.15 |

In producing the powdered or pulverized rubber of the invention from vulcanized scrap rubber, a mass of the scrap in the form of pieces of say four to eight mesh or even larger, may be loaded into the Banbury machine and subjected to the intense shearing action by the bladed rotors of the machine while exerting mechanical pressure on the mass to compact and densify it to an extent such that the shearing action will rapidly bring about a high input of mechanical energy.

However, according to the invention, in order to prevent agglomeration of the particles as they are being progressively subdivided by the working action of the machine, and otherwise to secure optimum grinding conditions, the temperature of the mass during the working thereof is not permitted to rise above a controlled level.

The maximum level of the temperature to which the mass is permitted to rise will depend primarily upon the character of the starting material, particularly its rubber-hydrocarbon content. In the case of the tire buffings, and gas ball stock, for example, the maximum temperature desirably should not exceed approximately 240° F.; whereas in the case of the latex sponge, having a considerably higher rubber-hydrocarbon content and a very "tight" cure, the maximum temperature may reach the order of 300° to 320° F., without significant agglomeration of even the finest particles.

In general, it may be stated that in order rapidly to convert vulcanized scrap rubber to the form of the powders contemplated by the present invention, the temperature of the mass during the grinding operation in the Banbury machine should be held at a level below that at which substantial agglomeration of subdivided particles will occur during the continued action exerted thereon. As will be evident from the foregoing and from the more specific illustrations given below, the level of permissible maximum temperature will depend upon the nature and the rubber hydrocarbon content of the vulcanized rubber being treated, as well as upon other factors which have been found to influence the grinding effect obtained in the operation.

An important feature of the invention resides in the reduction of the scrap to finely divided powder form within a matter of approximately one to four minutes. To that end, the action of the bladed rotors upon the vulcanized scrap is such as to bring about a high and rapid input of energy, thereby causing the temperature of the mass to rise relatively rapidly, suitable provision being made or precautions taken to prevent the temperature from exceeding the levels above-indicated during this period of treatment. Lacking such provision for holding the temperature of the mass below these levels, the temperature would readily reach the point at which the subdivided particles would become sufficiently softened, at least on their surfaces, to be deprived of their non-adherent, pulverent character and to cause substantial agglomeration thereof or formation of aggregates.

In this respect the treatment of the mass, according tot he present invention, is to be distinguished from the operation of the Banbury machine for the reclaiming of rubber as set forth in the above-mentioned Banbury patent, 2,461,192. As pointed out in the said patent, maintenance of conditions which bring about a high input of mechanical energy at a rapid rate by imposing a pressure of the order of 80 to 160 pounds per square inch by the ram upon the material in the working chamber and by the speed at which the rotors are operated, furnishes an energy input averaging not less than 1.5 horsepower per pound of material being treated and causes the temperature of the mass to be raised to the order of 425° to 550° F., within a matter of several minutes.

On the other hand, in operating the Banbury machine for pulverizing vulcanized rubber scrap, the temperature of the mass undergoing treatment is not permitted, as above stated, to rise above the levels indicated, preferably not above 220° to 250° F.

The temperature figures stated herein are based upon measurements with electronic recorders and are believed to be more accurate readings than those recorded by the usual Wheatstone bridge circuit. Hence, these temperature figures may be somewhat different than when taken by such usual methods.

In actual practice I have found that by pumping water at a temperature of say 45° to 55° F., at a sufficient velocity through the jacketed walls of the working chamber, as well as through the interior of the rotors, it is possible to prevent the temperature of the mass from rising above the stated temperatures even when the machine is operated under power input conditions higher than those contemplated in the Banbury Patent 2,461,192. In this way, the Banbury machine may be caused to operate upon vulcanized rubber scrap so as to function in a grinding capacity, rather than in a plasticizing or reclaiming capacity, with resultant production of powdered vulcanized rubber in ranges of fineness not heretofore obtainable and in time periods of the order of one to four minutes operation.

The velocity of the cooling water will, in general, depend upon the rates at which the temperature of the scrap rises under the influence of the mechanical input of energy by action of the rotors thereon, and upon the rate of heat transfer occurring on the one hand between the scrap and the metal wall of the chamber and rotors, and on the other hand, between the metal and the water in the jacket and rotors.

The principal factor of control, therefore, in producing the ground or pulverized rubber of the invention is to insure that during the intense shearing action exerted upon the material its temperature is not permitted to rise to such an extent as will substantially soften or tackify it or cause substantial de-vulcanization of the rubber during the progressive subdivision thereof by the mechanical action described.

In order to enable the scrap rubber to be subjected to the requisite internal shearing action under the influence of the bladed rotors of the Banbury machine, the rotors are preferably driven at a speed of 100 to 150 R. P. M., while at the same time the mass is compressed in the working chamber of the machine under a mechanical pressure of at least 150 pounds, desirably 170 pounds per square inch, by the ram. Under these conditions the power input resulting from the action of the rotors generally will average at least three horsepower per pound of material being treated, there being usually momentary peaks of power input as high as 1,000 to 1,200 horsepower.

In the case, for example, of a size 3A Banbury machine, in which the area of the working surface of the ram is 252 square inches, the pneumatic cylinder for operating the ram is preferably made to have an inside diameter of 16 inches, i. e., a cross-sectional area of 201 square inches, or more. Consequently, by using air or hydraulic pressure of say 200 pounds per square inch in the cylinder, the ram may be caused to exert a mechanical pressure of at least 160 pounds per square inch upon the material in the working chamber of the machine.

With this in view, the working chamber of the machine is loaded with the scrap rubber in a quantity such that the full pressure of the ram may be applied and the mass of material in the chamber thereby compacted to the degree required for enabling the rotors to exert their grinding effect throughout the period of time required for reducing the vulcanized scrap to a powder of the desired mesh size. If less than the optimum quantity is charged into the machine at the start of the operation, the ram may be lowered by the pressure in the operating cylinder to the point where it engages the limit stops in the so-called throat or neck of the machine, particularly after the material in the working chamber has become somewhat compacted. Under these conditions, the ram will not be exerting its full effect upon the material in the working chamber of the machine, with the result that there is a reduction in energy input necessary to obtain the shearing action required for reducing the material to the desired powdered condition.

On the other hand, if more than the optimum quantity of the scrap is initially loaded into the machine, portions of the mass may be trapped or otherwise extend far enough up into the throat or neck of the machine during the cycle of operation so as not fully to receive the intense shearing action of the rotors, with the result that the product yielded by the operation will lack the uniformity and finely divided condition desired.

The quantity of the starting batch, for a machine of any given cubic contents of working space (including in addition to the space in the working chamber, the space in the throat or neck to a distance about one-half inch below the ram stops) may readily be calculated from its specific gravity. Alternatively, it may be determined empirically from screen analyses of the powder obtained when using various initial quantities of the starting material, with any given speed of the rotors, ram pressure and time of treatment. Likewise the optimum time of treatment for any given speed of the rotors, ram pressure and size of batch, may be determined empirically from screen analyses of the resultant powders.

In general, it may be stated that with a size 3A Banbury, operated with a 600 horsepower motor, at a rotor speed of 100 R. P. M., the starting batch will amount to from 1 to 1.15 times the weight of the same volume of water.

Most varieties of commercially available scrap vulcanized rubber material from which the powdered rubbers of my invention may be made, contain substantial proportions of fillers, pigments and the like. These apparently contribute to the effectiveness of the grinding action of the Banbury machine when operated as herein described. It appears, at any rate, that in the presence of such finely divided solid components capable of functioning as grinding agents in the process, greater yields of finer mesh powder are obtained from a given starting batch than is otherwise the case.

Thus, while many varieties of scrap vulcanized rubber can, by the process of the invention, be reduced to powders containing relatively high proportions of particles of forty mesh and finer, those available varieties of scrap vulcanized rubber which do not contain, or which contain inadequate amounts of, such fillers or other finely divided substances capable of functioning as grinding agents, may nevertheless be readily handled by the process, with the addition of adequate amounts of any one of a number of suitable agents for that purpose. The term "grinding agent" herein is to be understood as meaning a finely divided solid substance of a fineness to be capable of assisting in the ultimate subdivision of the ground rubber under the conditions prevailing during the mechanical action exerted thereon as herein set forth.

Among substances that may thus be utilized as grinding agents in the process are whiting, carbon black, and the like. Preferably, these are initially charged into the machine, along with the vulcanized scrap in suitable quantities. As already indicated, however, the use of such supplemental grinding agents, is not necessary if the vulcanized scrap used as the starting material is one which already contains adequate quantities of materials capable of functioning as grinding agent or agents to assist in the grinding operation as already described.

The following examples and data will more specifically illustrate the invention.

*Example 1*

In this example, the scrap vulcanized rubber employed was so-called gas ball stock. This material may be said to be typical of vulcanized rubber heavily loaded with fillers or other finely divided solids as components of the vulcanized rubber compound, the hydrocarbon content of the scrap being approximately 30%. Generally, the non-rubber hydrocarbon constituents comprise substantial quantities of fillers, pigments, etc., such as whiting and/or carbon black.

Batches of this stock (in certain instances with the addition of grinding agents) were subjected to treatment as above described in a size B Banbury machine, with the ram holding the material in the working chamber under a mechanical pressure such as to develop power inputs averaging at least three horsepower per pound, in cycles of operation varying from 1½ to 4 minutes. The data for each of these runs are given in the following tabulation.

| Batch | Composition (in grams) | | Maximum Temperature (° F.) | Cycle of Operation, minutes |
|---|---|---|---|---|
| A | Gas Ball Stock | | 1,680 | 240 | 4 |
| B | Gas Ball Stock | | 1,770 | 240 | 3 |
| C | Gas Ball Stock | | 1,770 | 240 | 1½ |
| D | Gas Ball Stock | 1,680 | 240 | 2 |
|   | Whiting | 125 | | |
| E | Gas Ball Stock | 1,680 | 240 | 2 |
|   | Whiting | 250 | | |
| F | Gas Ball Stock | 1,680 | 295 | 2 |
|   | Whiting | 250 | | |

Screen analyses of the finely divided powders obtained at the conclusion of the respective cycles of operation upon the foregoing batches showed the following results:

| Screen U. S. No. | Batch A | | Batch B | | Batch C | | Batch D | | Batch E | | Batch F | |
|---|---|---|---|---|---|---|---|---|---|---|---|---|
| | Percent Retained | Percent Cumulative | Percent Retained | Percent Cumulative | Percent Retained | Percent Cumulative | Percent Retained | Percent Cumulative | Percent Retained | Percent Cumulative | Percent Retained | Percent Cumulative |
| 12 | 5.24 | 5.24 | 11.88 | 11.88 | 10.43 | 10.43 | 6.10 | 6.10 | 7.09 | 7.09 | 36.08 | 36.08 |
| 16 | 3.94 | 9.18 | 5.27 | 17.15 | 6.06 | 16.49 | 6.28 | 12.38 | 4.34 | 11.43 | 8.27 | 44.35 |
| 20 | 3.24 | 12.42 | 4.48 | 21.63 | 5.51 | 22.00 | 6.49 | 18.87 | 4.11 | 15.54 | 5.70 | 50.05 |
| 40 | 25.99 | 38.41 | 11.00 | 32.63 | 17.73 | 39.73 | 18.91 | 37.78 | 9.65 | 25.19 | 13.56 | 63.61 |
| 50 | 43.35 | 81.76 | 22.91 | 55.54 | 20.26 | 59.99 | 16.95 | 54.73 | 9.66 | 34.85 | 12.44 | 76.05 |
| 70 | 14.66 | 96.42 | 26.76 | 82.30 | 31.78 | 91.77 | 23.88 | 78.61 | 17.32 | 52.17 | 15.32 | 91.37 |
| Pass | 3.57 | 99.99 | 17.68 | 99.98 | 8.22 | 99.99 | 21.39 | 100.00 | 47.83 | 100.00 | 8.63 | 100.00 |

As will be observed from the foregoing screen analyses, highly desirable powders can be obtained by my process when starting with a scrap vulcanized rubber that is relatively heavily loaded with fillers or the like, as is the case with so-called gas ball stock, without the necessity of adding any extraneous grinding agents. This is made clear from the screen analyses for Batches A, B and C. The effect of the addition of extraneous grinding agent can be seen by comparing, for example, the screen analysis of Batch A with those for Batches D and E. As will be noted, the presence of approximately 7% of added whiting in Batch D increased the amount passing 70 mesh to 21.39%, compared to 3.57% in the case of Batch A; the presence of approximately 13% of added whiting in the case of Batch E, increased the amount passing 70 mesh to 47.8%.

As will be observed from the foregoing screen analyses, the fineness of the resultant powder is dependent upon and may be controlled by the temperature maintained in the machine during the cycle of operation. Thus, comparing Batch E run at a maximum temperature of 240° F., with Batch F run at a maximum temperature of 295° F., the latter shows considerably higher percentages cumulative retained on 70 mesh, as well as on the screens with larger diameter openings.

Also, it will be noted, the product of Batch F shows a larger percentage of particles retained on the 12 mesh screen than is the case with the product of Batch E. These particles apparently are agglomerates formed during that stage of the operating cycle at which the higher temperature was reached.

*Example 2*

The scrap vulcanized rubber employed was a material generally referred to in the industry as "tire buffings." This is a type of scrap rubber containing only relatively small amounts of filler or like material, as compared to the gas ball stock employed as the starting material in Example 1. The rubber hydrocarbon content of tire buffings is generally of the order of 55%.

Six separate batches of this tire buffing material were subjected to treatment in the same machine is referred to in Example 1. The cycle of operation in each instance was approximately four minutes. The temperature during each cycle was held to a maximum of 240° F. The batches were composed of the following:

Amount in grams

Batch G ———————— 1,300.
Batch H ———————— 1,430.
Batch I ———————— { 1,300
                     125 whiting.
Batch K ———————— { 1,300
                     250 whiting.
Batch L ———————— { 1,200
                     250 Multifex (colloidal CaCO₃).
Batch M ———————— { 1,200
                     300 HAF carbon black.

The screen analyses of the powders resulting from the treatment of these several batches under the conditions stated, showed the following results:

| Screen U. S. No. | Batch G | | Batch H | | Batch I | | Batch K | | Batch L | | Batch M | |
|---|---|---|---|---|---|---|---|---|---|---|---|---|
| | Percent Retained | Percent Cumulative | Percent Retained | Percent Cumulative | Percent Retained | Percent Cumulative | Percent Retained | Percent Cumulative | Percent Retained | Percent Cumulative | Percent Retained | Percent Cumulative |
| 12 | 96.51 | 96.51 | 74.49 | 74.49 | 42.28 | 42.28 | 15.92 | 15.92 | 8.74 | 8.74 | 4.09 | 4.09 |
| 16 | 1.57 | 98.08 | 15.12 | 89.61 | 42.13 | 84.41 | 9.95 | 25.87 | 7.50 | 16.24 | 5.73 | 9.82 |
| 20 | 0.80 | 98.88 | 5.57 | 95.18 | 8.59 | 93.00 | 9.55 | 35.42 | 6.86 | 23.10 | 6.06 | 15.88 |
| 40 | 0.85 | 99.73 | 4.34 | 99.52 | 5.33 | 98.33 | 50.37 | 85.79 | 16.86 | 39.96 | 21.66 | 37.54 |
| 50 | 0.15 | 99.88 | 0.44 | 99.96 | 1.11 | 99.44 | 9.18 | 94.97 | 15.70 | 55.66 | 16.72 | 54.26 |
| 70 | 0.02 | 99.90 | 0.02 | 99.98 | 0.33 | 99.77 | 3.79 | 98.76 | 25.60 | 81.26 | 23.06 | 77.32 |
| Pass | 0.09 | 99.99 | 0.02 | 100.00 | 0.24 | 100.01 | 1.25 | 100.01 | 18.72 | 99.98 | 22.68 | 100.00 |

The foregoing screen analyses demonstrate the desirability and advantage of conducting the operation under the conditions of high rate of input of mechanical energy in accordance with the invention, in the presence of finely divided materials capable of functioning as grinding agents. The incorporation of such grinding agents, hence, is especially of advantage in the case of scrap vulcanized rubbers that do not themselves contain adequate amounts of such substances. This will plainly appear from a comparison of the screen analyses in the case of Batches G or H, with the analysis in the case of Batch I in which approximately 8.7% whiting was incorporated, and even more significantly with Batch K in which approximately 16% whiting was incorporated with the scrap rubber.

Moreover, the foregoing screen analyses demonstrate the influence of the particle size of the grinding agent in improving the quality of the resultant powder. Thus, comparing the screen analysis in the case of Batch K with that for Batch L, it will be seen that with the Multifex substituted for the whiting, Batch L yielded higher percentages of finer particles and lower percentages of coarser particles than in the case of Batch K. When carbon black was used as the grinding agent as in Batch M, this improvement of the product was even more evident. The whiting, Multifex and carbon black used in these batches are of decreasing average particle size, in the order named.

Example 3

Under this example, scrap vulcanized latex sponge was converted to finely divided powders in accordance with the invention. This material contains, usually about 95% rubber hydrocarbon. Although this type of material can, due to its thin wall cellular and porous character, be reduced to finely divided powder in the practice of the invention, the use of extraneous grinding agents in conjunction therewith gives superior results, as will be seen from the data given below. Also, it may be noted, due to the tightness of cure of this material, higher temperatures can be tolerated during the cycle of operation, without giving rise to substantial agglomeration of the finer particles, such as occurs in the case of the types of vulcanized scrap rubber referred to under Examples 1 and 2.

For the purpose of illustrating the practice of the invention with this type of vulcanized scrap rubber, data is given below with respect to six batches which were ground in accordance therewith, utilizing the same Banbury machine as in the case of Examples 1 and 2, with a grinding cycle of approximately two minutes in each instance. The maximum temperature during the cycle was, in each instance, 300° F., except in the case of Batch P, in which the maximum temperature was 330° F. The batches were composed as follows:

Amount in grams

Batch N_____ 1,587.
Batch P_____ 1,587.
Batch Q_____ { 1,360
                      85 Millical (colloidal CaCO₃).
Batch R_____ { 1,360
                      85 Millical (colloidal CaCO₃).
Batch S_____ { 1,162
                      240 Millical (colloidal CaCO₃).
Batch T_____ { 1,162
                      240 Millical (colloidal CaCO₃).

The screen analyses of the resultant powders obtained from these batches were as follows:

| Screen U.S. No. | Batch N | | Batch P | | Batch Q | |
|---|---|---|---|---|---|---|
| | Percent Retained | Percent Cumulative | Percent Retained | Percent Cumulative | Percent Retained | Percent Cumulative |
| 8 | 4.8 | 4.8 | 8.5 | 8.5 | 13.06 | 13.06 |
| 12 | 2.5 | 7.3 | 3.8 | 12.3 | 0.66 | 13.72 |
| 16 | 4.1 | 11.4 | 3.1 | 15.4 | 1.18 | 14.90 |
| 20 | 4.8 | 16.2 | 2.4 | 17.8 | 1.96 | 16.86 |
| 30 | 7.1 | 23.3 | 12.9 | 30.7 | 3.81 | 20.67 |
| 40 | 39.7 | 63.0 | 44.6 | 75.3 | 12.41 | 33.08 |
| Pass | 37.0 | 100.0 | 24.7 | 100.0 | 66.91 | 99.99 |

| Screen U.S. No. | Batch R | | Batch S | | Batch T | |
|---|---|---|---|---|---|---|
| | Percent Retained | Percent Cumulative | Percent Retained | Percent Cumulative | Percent Retained | Percent Cumulative |
| 8 | 17.06 | 17.06 | | | | |
| 12 | 4.56 | 21.62 | | | | |
| 16 | 4.64 | 26.26 | 2.54 | 2.54 | 2.30 | 2.30 |
| 20 | 4.44 | 30.70 | 2.46 | 5.00 | 2.35 | 4.65 |
| 30 | 5.91 | 36.61 | | | | |
| 40 | 9.85 | 46.46 | 10.52 | 15.52 | 12.14 | 16.79 |
| Pass | 53.54 | 100.00 | | | | |
| 50 | | | 29.06 | 44.58 | 32.98 | 49.77 |
| 70 | | | 22.41 | 66.99 | 24.11 | 73.88 |
| 100 | | | 24.56 | 91.55 | 20.08 | 93.96 |
| Pass | | | 8.45 | 100.00 | 6.04 | 100.00 |

From the above, it will again be seen by comparison of the screen analyses for batches N and P with those for batches Q and R, that incorporation of approximately 6% of a grinding agent in the batch greatly increases the percentage of fines recovered. Further, the screen analyses for batches S and T show that incorporation of 17% of the grinding agent with this type of scrap decreases the amount of the product retained on the sixteen mesh screen to less than 3%, and yields more than 80% of the material passing the forty mesh screen.

In operation, therefore, the occurrence of agglomerates in the product may be taken as an indication that the optimum grinding stage has been passed, due either to an excessive cycle of operation, or to excessive speeds of the rotors, or to inadequate rate of heat transfer between the material undergoing the treatment and the jacket and rotors of the machine, or to a combination of any two or more of these factors, since all of these factors contribute in greater or lesser measure to the conditions which give rise to formation of agglomerates of otherwise finely divided particles obtained under optimum conditions.

Accordingly, in the practice of the invention, the employment of extraneous grinding agents in conjunction with the particular scrap vulcanized rubber to be ground will be governed by the nature of the scrap and the functioning of the particular machine employed, and the grinding agent or agents, if employed, will be so chosen as to the physical characteristics thereof and employed in such proportion, for any given batch, as will facilitate securing a product of the selected mesh size.

As above stated, powders obtained in accordance with the invention from the various scrap vulcanized rubbers find usefulness for a variety of industrial purposes. Among these may be mentioned their use as compounding agents, and the like. They may also be employed for admixture with asphalt in the production of bituminous concrete paving mixtures, as well as in the production of various types of asphalt coatings and similar compositions in which it is desired that proportions of rubber be present. The powdered vulcanized rubbers of the invention lend themselves admirably to these latter uses, to a much more beneficial and economical extent than powdered vulcanized rubber known prior to my invention, by reason of the ease with which they may be blended with, or dispersed or brought into solution in asphalt and the like.

Still another valuable use for the powders obtained by my invention is as a starting material for the production of reclaimed or de-vulcanized rubber by any of the conventional reclaiming processes. Because of the finely divided character of the scrap vulcanized rubber powders of my invention, they would serve with great advantage as the raw material for any such rubber reclaiming processes, such as the known alkali or acid digestion processes, the so-called pan method of reclaiming rubber in autoclaves, and other known reclaiming processes. In all such processes, particularly those procedures wherein so-called reclaiming agents and softeners are employed, the effectiveness of the latter is greatly enhanced when the scrap vulcanized rubber to be reclaimed is in the form of the finely divided powders of my invention.

As will be understood, of course, if it is desired to utilize for any particular purpose, only those portions of the product which are of selected mesh sizes, say only such as will all pass through 70 mesh, or through 100 mesh, these portions may readily be segregated by sieving through screens of the selected mesh size.

Likewise, if the amount of extraneous grinding agent utilized to obtain in any given case the optimum operating conditions and desired mesh size of the powdered rubber, is such as to be undesirable as a constituent of the product for any intended use thereof, the grinding agent or desired proportions thereof may be separated from the ground rubber, as by screening the same. Thus, in certain uses for which the ground rubber products of the invention may be employed, the presence of whiting may be objectionable. In such instances, the whiting may accordingly be separated from the ground rubber product of the invention, as aforesaid.

Having described my invention, what I claim is:

1. A process of reducing scrap vulcanized rubber to finely divided form, which comprises subjecting a mass of the scrap in a confined working space to intense shearing action of an order such as to bring about an input of energy averaging not less than 1.5 horsepower per pound of the scrap, circulating fluid cooling medium through the walls of said working space whereby to prevent said energy input from causing a rise in the temperature of the mass above about 320° F., continuing such action while maintaining the scrap at a temperature below that stated for a period of time within the range of approximately one to four minutes to cause the scrap to be transformed into a finely divided powder without significant devulcanization of the rubber such as would manifest itself by substantial agglomeration of the particles, at least 80% of said powder being sufficiently fine to pass a 40 mesh screen, and discharging the thus powdered material from said working space at the end of said time cycle.

2. A process as defined in claim 1, wherein said scrap is tire scrap.

3. A process of reducing scrap vulcanized rubber to finely divided form, which comprises subjecting a mass of the scrap in a confined working space to intense shearing action of an order such as to bring about an input of mechanical energy averaging not less than about 1.5 horsepower per pound of the scrap while circulating a cooling fluid through the walls of said working space to prevent the temperature of the scrap from exceeding about 320° F., whereby to enable the scrap to be reduced, in a period of time within the range of approximately one to four minutes, to particles of the desired size, and maintaining the temperature therebelow to prevent the finer of said particles from agglomerating to an extent such that more than about 10% of the starting material will be in the form of agglomerates coarser than 12 mesh, and discharging said powdered scrap from said working space.

4. A process of reducing scrap vulcanized rubber to finely divided form, which comprises subjecting a mass of the scrap in a confined working space to intense shearing action of an order such as to bring about an input of energy averaging not less than 1.5 horsepower per pound of the scrap, circulating fluid cooling medium through the walls of said working space whereby to prevent said energy input from causing a rise in the temperature of the mass above about 320° F., continuing such action while maintaining the scrap at a temperature below that stated for a period of time within the range of approximately one to four minutes to cause the scrap to be transformed into finely divided powder without significant devulcanization of the rubber such as would manifest itself by substantial agglomeration of the particles, said powder being of a fineness such that not less than approximately 60% thereof passes a 40 mesh screen, and discharging the thus powdered material from said working space at the end of said time cycle.

5. A process as defined in claim 4, wherein said energy input is developed by shearing action exerted upon the mass of the scrap held under mechanical pressure in adjoining chambers of said confined space throughout said time cycle, and wherein the shearing action simultaneously causes the material to be kneaded while moving in the opposite directions in the chambers.

6. A process as defined in claim 4, wherein said scrap is tire scrap.

7. A process as defined in claim 5, wherein said scrap is tire scrap.

8. A process as defined in claim 4, wherein from about 5% to about 20%, by weight, of a grinding agent is incorporated with said scrap, whereby to substantially increase the yield of particles finer than 40 mesh, compared to the yield thereof by the same treatment of said scrap in the absence of said grinding agent.

9. A process as defined in claim 8, wherein said scrap is tire scrap.

References Cited in the file of this patent

UNITED STATES PATENTS

| | | |
|---|---|---|
| 2,221,490 | Robinson | Nov. 12, 1940 |
| 2,347,464 | Cuno | Apr. 25, 1944 |
| 2,461,192 | Banbury et al. | Feb. 8, 1949 |
| 2,487,666 | Navone | Nov. 8, 1949 |
| 2,554,607 | Woolf | May 29, 1951 |

FOREIGN PATENTS

| | | |
|---|---|---|
| 456,016 | Canada | Apr. 19, 1949 |

OTHER REFERENCES

Le Beau: India Rubber World, February 1953, volume 127, No. 5, page 660.

Le Beau: Rubber Age, September 1953, volume 73, No. 6, pages 785 through 791.

UNITED STATES PATENT OFFICE
CERTIFICATE OF CORRECTION

Patent No. 2,853,742                                          September 30, 1958

Paul J. Dasher

It is hereby certified that error appears in the printed specification of the above numbered patent requiring correction and that the said Letters Patent should read as corrected below.

Column 4, line 43, for "pulverent" read -- pulverulent --; line 46, for "tot he" read -- to the --; column 6, line 63, Example 1, after "rubber" insert -- rather --; column 10, line 51, beginning with "They may also" strike out all to and including "and the like." in line 62, same column.

Signed and sealed this 16th day of December 1958.

(SEAL)
Attest:
KARL H. AXLINE

Attesting Officer

ROBERT C. WATSON
Commissioner of Patents